INVENTORS
ARTHUR H. LONG
ALEXANDER SHASHATY
BY William D. Carothers
THEIR ATTORNEY Jan. 17, 1967  A. H. LONG ETAL  3,298,089
COUPLING SCREW-ON-MACHINE
Original Filed March 27, 1963  7 Sheets-Sheet 3

INVENTORS
ARTHUR H. LONG
ALEXANDER SHASHATY
BY William D. Carothers
THEIR ATTORNEY സ
United States Patent Office 3,298,089
Patented Jan. 17, 1967

3,298,089
COUPLING SCREW-ON-MACHINE
Arthur H. Long, Columbiana, and Alexander Shashaty, Youngstown, Ohio, assignors to Wm. K. Stamets Company, Pittsburgh, Pa., a corporation of Pennsylvania
Continuation of application Ser. No. 268,375, Mar. 27, 1963. This application June 1, 1964, Ser. No. 371,853
16 Claims. (Cl. 29—240)

This is a continuation of application Serial No. 268,375, filed March 27, 1963 now abandoned.

This invention relates generally to production machines and more particularly to a high speed coupling screw on machine for screwing couplings on pipe to hand tight or power tight with a single chucking.

The present machines for screwing on couplings require two machines for the separate stages. In the first machine, the pipe and coupling member are chucked to screw the coupling on at a fast rate of speed. These members are then unchucked and the pipe with the partially threaded coupling is then moved to a slow speed machine where they have to be rechucked and the machine running at a slow speed will screw the coupling up to a predetermined torque of tightness. This requires two separate machines connected with a transfer mechanism with the accompanying electrical and mechanical complication. In the machine comprising this invention both starting of the coupling on the pipe as well as tightening to a predetermined torque occurs at the same station with the accompanying electrical and mechanical simplicity, which is the principal object and advantage of this invention.

The important feature of this invention resides in the fact that the coupling is stabbed and chucked in one continuous movement into a constantly rotating chuck that turns at a relatively high speed and can hand tighten the coupling on the pipe. To further tighten the coupling without rechucking, the high speed motor is reversed and driven through a jack shaft to provide low speed torque in the same direction to power tighten the coupling on the pipe.

With this invention the chucking time is speeded up because the pipe stabs the loose coupling and forces into the chuck in one movement where the high speed rotating chuck is automatically clamped on the coupling to run it up to hand tight, which condition is determined by the rotative axial position of the coupling on the pipe thread. If hand tight is all the further the coupling is to be tightened then time has been saved in the chucking and unchucking periods.

If the coupling is to be tightened to a predetermined torque this torque is sensed electrically by monitoring the motor load. When the desired tightness is reached the coupling chuck is opened. The power tight coupling is applied with the same chuck and without even changing the machine or the work. To get a high torque the motor is reversed and the gear train is driven through a jack shaft. The low speed high torque on the coupling turns the same to its predetermined torque tightness and upon reaching power tightness a motor load monitor will open the chuck. This permits immediate withdrawal and index of the pipe to immediately remove the pipe and coupling members and at the same time insert a new pipe and coupling in position to repeat the cycle. This machine thus materially reduces the time cycle for hand and power tight screwing-on of the coupling on the pipe.

Overrunning clutches are preferably used for the high and reversed low speeds for driving the coupling chuck as the latter immediately reacts to slow down the coupling and apply ample torque for the maximum torque tightness in a very short time. However, clutches actuated hydraulically, pneumatically, and electrically may well be employed in place of the overrunning clutches for the same purpose. The overrunning clutches give less trouble.

Another object is the provision of a novel coupling feed block which positions one coupling to the vicinity of the rotary axis of the coupling chuck to be stabbed by the pipe on which the coupling is to be made. This feeder block also retains the couplings in readiness for the next feeding. This block is withdrawn by a fluid actuated lift wedge that provides a novel structural feature for this invention.

The pipe chuck is an upwardly open pivot chuck that can take any size of pipe. This chuck may be fluid or motor actuated by means of bell crank levers which may clamp and lock the pipe in position to stab and pick up the coupling for chucking the same. The pipe chuck is slidable on ways to stab the pipe into the coupling.

Other objects and advantages of this invention appear hereinafter in the following description and claims.

The accompanying drawings show for the purpose of exemplification without limiting this invention or the claims thereto, certain practical embodiments illustrating the principles of this invention wherein:

Figure 1:
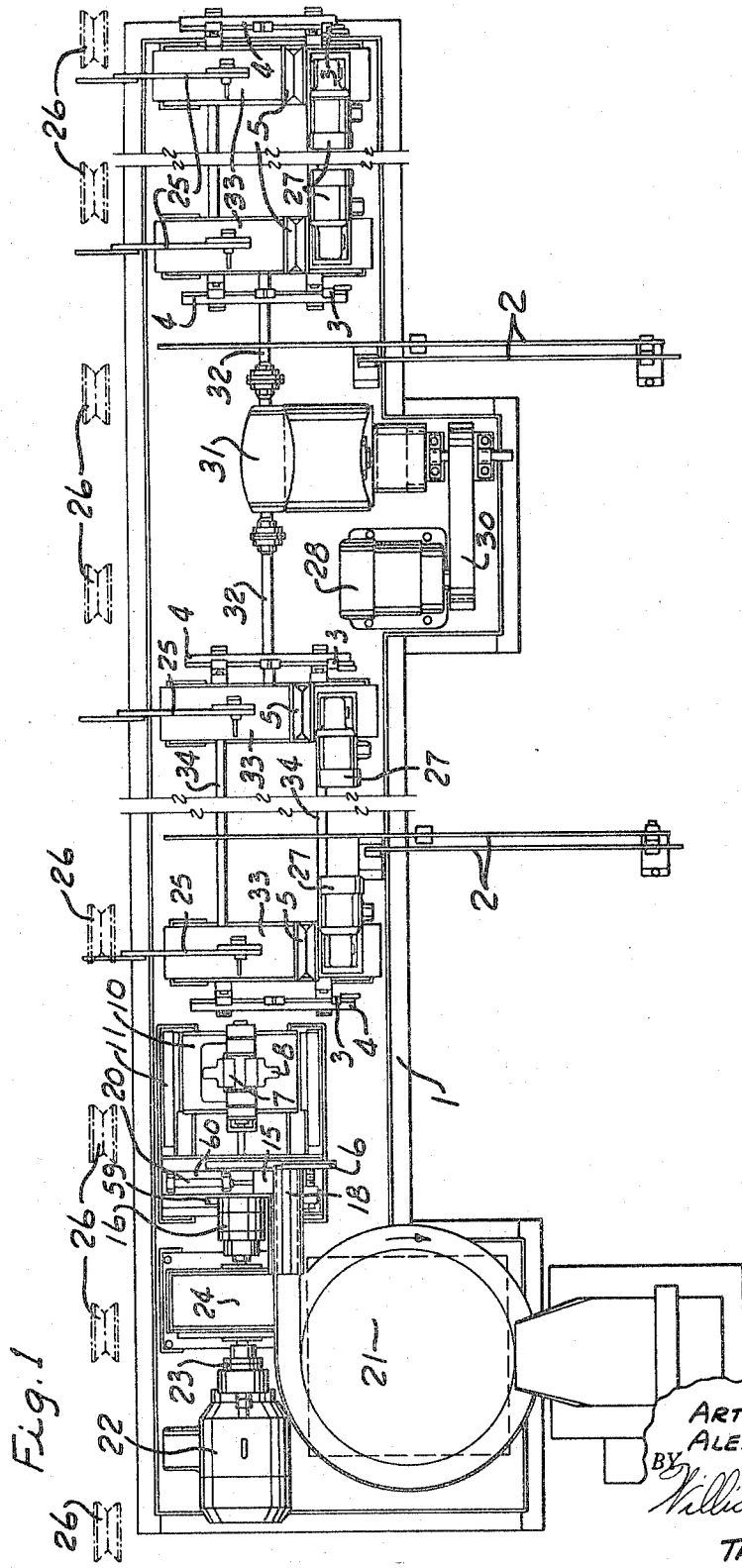
FIG. 1 is a reduced plan view of the complete coupling screw on machine comprising this invention.
Figure 2:
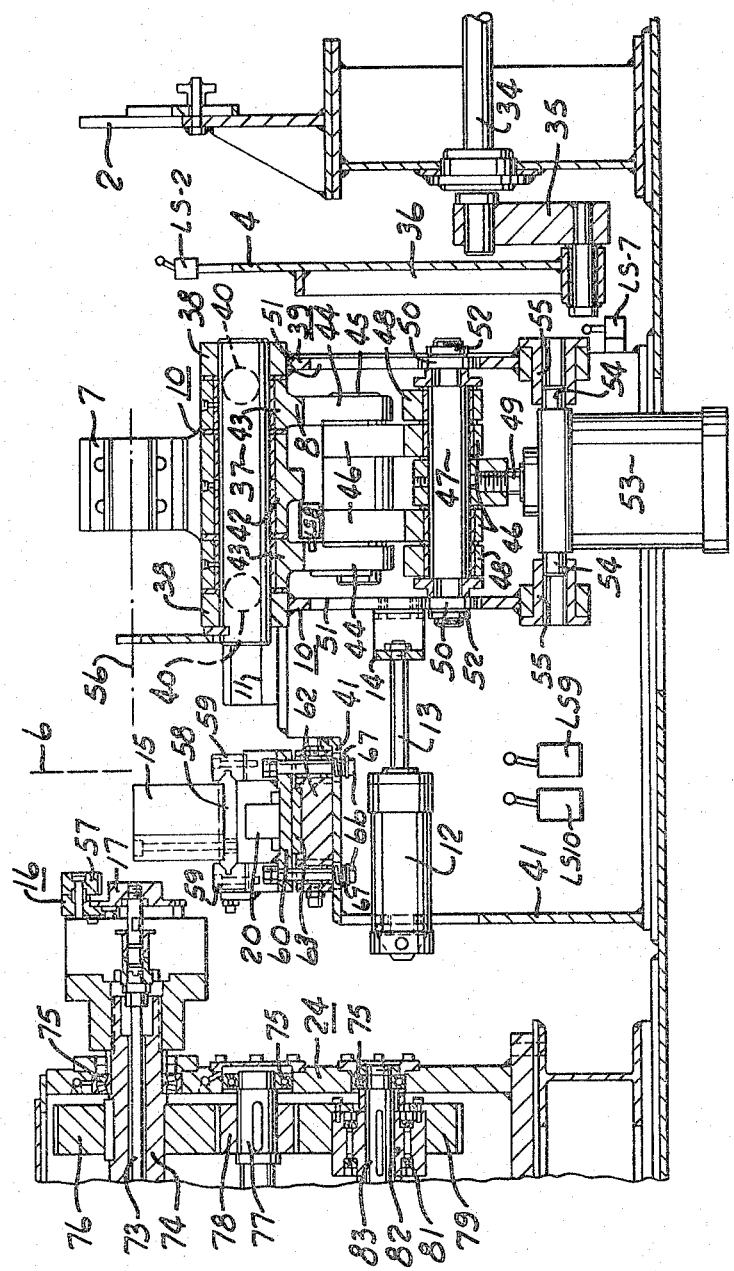
FIG. 2 is a view in longitudinal vertical section showing a portion of the coupling chuck drive, the coupling feeder and the pipe chuck with its stab actuating cylinder.
Figure 8:
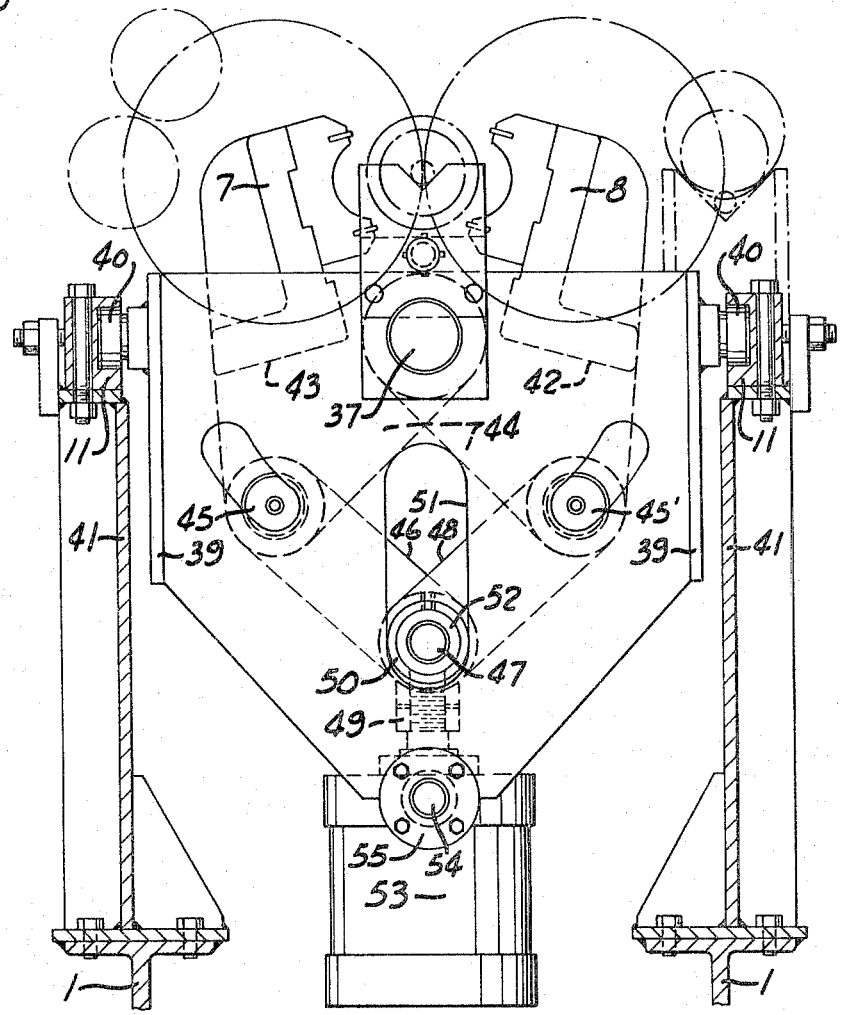
FIG. 8 is a transverse vertical section showing a frontal view of the pipe chuck of FIG. 2.

Referring to FIG. 1 of the drawings the foundation 1 supports suitable standards carrying the skids 2 on which the pipe is rolled toward the threaded machine and is stopped by the stop members 3 on the walking beam feeders 4 which pick up consecutive pipe members and deliver them to the positioning rollers 5 which move the pipe to the left and engages the pipe stop 6, the walking beam in its next operation will lift the pipe and insert it in the upwardly open jaws 7 and 8 of the pipe chuck 10 which includes the frame or carriage 39 supported on rollers 40 operable in the track ways 11 as shown in FIG. 8. The pipe chuck 10 is movable along the track ways 11 by means of the feed cylinder 12 as shown in FIG. 2. The piston 13 is connected by the bracket 14 to the pipe chuck 10. When the pipe is chucked and the chuck with the pipe moves to the left on the track ways 11, the end of the pipe stabs a coupling from the feed block 15 and carries the coupling into the coupling chuck 16 where it engages actuating member 17 to close the chuck and clamp the coupling therein while rotating at a very high speed. As shown in FIG. 1 the feed block 15 is reciprocated back and forth transversely from the coupling feeder chute 18 by means of the fluid motor 20. The couplings are fed by the electromagnetically operated feeder bowl 21 wherein the couplings are oriented for travel in the direction of the arrow around the track discharging them on the chute 18 above one another with axial openings parallel with the axial alignment of the coupling and pipe member chucks. The coupling chuck 16 is driven by the alternating current motor 22, the horsepower of which is determined by the torque requirement, and the speed is preferably 1200 revolutions per minute which may be reversible and drives through the coupling 23, the train of gears in the gear box mechanism 24. When the coupling is fully screwed on the pipe to selected tightness the coupling chuck 16 is opened and the pipe chuck 10 retracts the assembled pipe and opens its jaws 7 and 8. Then the walking beams 4 lift the pipe and set it on the skids 25 where the pipe with the threaded coupling passes through the line of rolls 26 and is fed in either direction from the machine.

The rollers 5 in the positioning roll line are actuated by independent motors 27 and the walking beams 4 which indexes the pipe into the positioning line then into alignment with the coupling and pipe chucks and then from this position to the rolls 26, are actuated by the motor 28 operating through the drive 30 and the speed reducer 31 which has an output in opposite directions as indicated by the shafts 32 and function through the intermediate drive mechanism 33 to rotate the shafts 34 that are provided with cranks for actuating the walking beams 4 in a circular path.

As shown in FIG. 2 the shafts 34 are provided with the cranks 35 pivotally connected to the depending arm on the walking beam member 4 for raising the pipe from the skids 2 to position the same between the jaws 7 and 8 of the pipe chuck 10. As shown in FIG. 8 as well as FIG. 2, the jaws 7 and 8 of the pipe chuck 10 are pivotally supported on the chuck pivot shaft 37 carried by the bearings 38 in the frame or carriage 39 which is supported by rollers 40 on the track ways 11. The frame 39 is attached to the bracket 14 to which the piston 13 is secured. The cylinder 12 is mounted on the frame 41 which supports the track ways 11 and which in turn is secured on the foundation 1.

The jaw member 7 is provided with a bearing section 42 whereas the jaw member 8 is provided with spaced bearing sections 43. The spaced bearing sections 43 as shown in FIG. 2 have the arms 44 extending downwardly to receive the pin 45 and which in turn have pivoted therein the links 46 which are in turn pivoted on the cylinder pin 47. A similar arm and link arrangement is extended from the bearing 42, the links 42', and the pin 45' and terminates in the link 48 which are likewise journaled on the pin 47. The ends of the pin 47 are provided with the guided rollers 50 which are held in place by the nut members 52 and operate in vertical slots 51 in the chuck carriage 39. The intermediate portion of the pin 47 is secured to the end of the piston 49 operable in the fluid cylinder 53 supported by the opposed trunnions 54 journaled in the bearings 55 at the bottom of the carriage 39. Thus the opposed links 46 and 48 are longer than the distance between the pins 45 and 45' to which the depending jaw members are pivoted and any force upwardly by the piston 49 will lock the clamp arms 7 and 8 on the chuck pivot 37 toward each other and thereby clamp any pipe held between the jaws 7 and 8. Thus when the cylinder 53 is energized to force the piston 49 upwardly, jaws 7 and 8 will close on the pipe and thereby chuck the same on the center line 56.

When a threaded pipe is chucked on the center line 56 between the chuck jaws 7 and 8 the cylinder 12 is energized to draw the carriage 39 along the track ways 11 and cause the end of the pipe to stab a coupling resting on the block 15. The threads of the pipe then enter the threads of the coupling and carry the coupling to the left in FIG. 2 to where it engages the member 17. The member 17 can be forced inwardly due to the forward motion of the carriage 39, the spring or resilient resisting member 19 taking up the forward shock and movement. As the carriage 39 moves forward and the coupling engages the member 17, the member 17 can be forced somewhat inwardly due to the spring or resilient resisting member 19 taking up this forward shock and movement. However, the primary importance of the spring or resilient resisting member 19 is actually to actuate the jaws 57 of the chuck 16 and this is done by the fluid motor 72 when energized.

Figure 3:
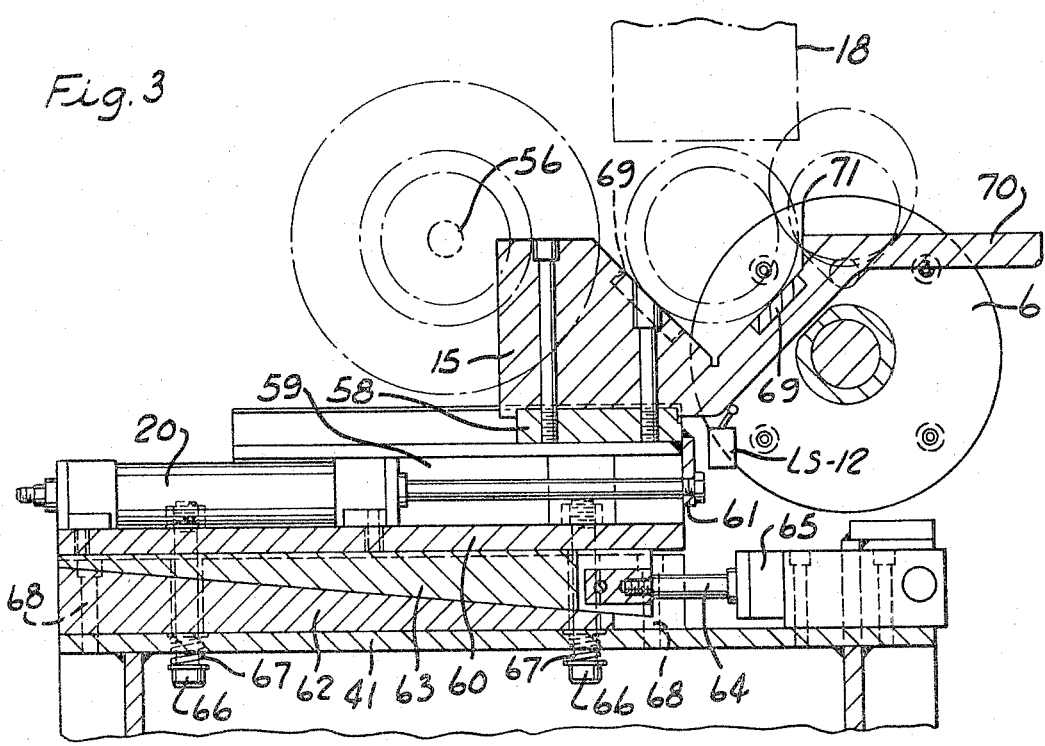
FIG. 3 is a view in transverse vertical section showing the coupling feed.

Referring again to FIGS. 2 and 3 the coupling feeder block 15 is secured to the slide 58 the opposite sides of which are shaped to be received in the corresponding slots in the space guide members 59 in spaced relation mounted on the plate 60. The piston of the fluid motor 20 is secured to the slide 58 through the bracket 61. The plate 60 in turn is horizontally supported on the block 62 that is in turn mounted on the lower frame 41. The block 62 has its upper surface tapered as indicated in FIG. 3 to receive the tapered wedge 63 the upper surface of which is flat to engage under the plate 60 and the lower surface of which has a face tapered complementary to that of the upper face of the block 62. The large end of the wedge 63 is connected to the piston rod 64 operated in the cylinder 65 which has a relatively short movement for the purpose of withdrawing the wedge 63 so as to lower the plate 60 and the coupling feeder block 15 so that it is free from engagement with the coupling as the latter leaves the upwardly open groove and is moved on to the coupling chuck 16. The plate 60 and the block 62 are resiliently coupled to each other by the bolts 66 which couple the assembly between the springs 67. This resiliency holds the plate 60 against the upper surface of the wedge 63 and prevents the plate from moving with the wedge. The block 62 in turn is held by the screw members 68 to the frame 41. Clearance holes are provided for the springs 67.

Referring again to FIG. 3 the coupling feed block is shown at the coupling pickup position under the chute 18 of the feeder bowl 21. This feed block is provided with an extended section 70 which extends to the loading position under the chute 18 when the top of the block 15 is in line with the center line 56. At this position the extension 70 supports the couplings in the chute 18 and the sides of the chute together with the shoulder 71 of the section 70 will select one coupling at a time and support the rest of the couplings in the chute 18 while the selected coupling is being stabbed and threaded.

Permanent magnet inserts 69 are provided in the upwardly open surfaces of the V-shaped feed block 15 to retain each coupling against movement laterally due to the inertia of the coupling when the feed block 15 is actuated by the fluid motor 20.

Figure 4:
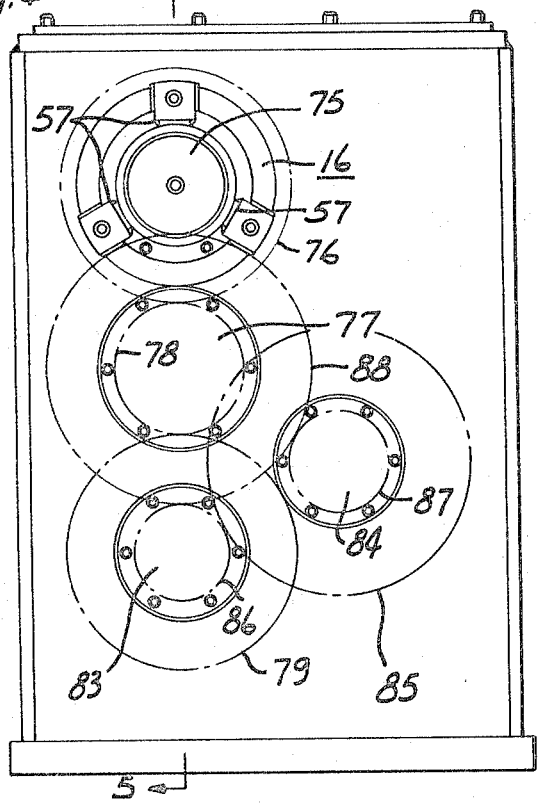
FIG. 4 is a view in transverse vertical section showing the coupling chuck drive.
Figure 5:
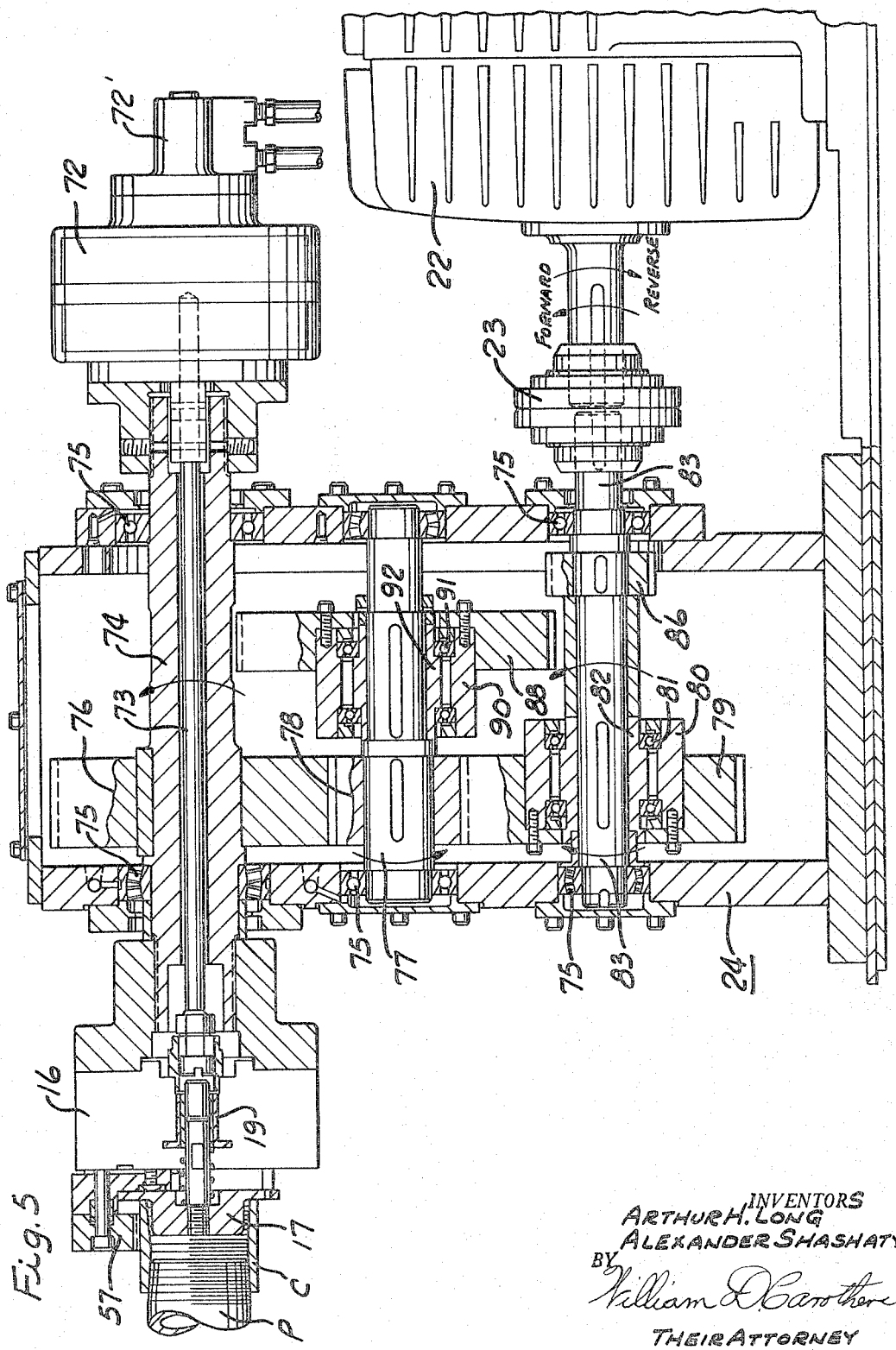
FIG. 5 is a view in longitudinal vertical section taken on the line 5—5 of FIG. 4.

Referring now to FIGS. 2, 4 and 5 it will be noted that the last of these figures shows the coupling C and pipe P in threaded position with the coupling substantially threaded on the pipe and the jaws 57 of the coupling chuck 16 are actuated by the fluid motor 72 which is provided with a mechanism not shown to force the jaw members inwardly onto the coupling upon the longitudinal movement of the piston rod 73. The details of this structure do not form part of this invention and, therefore, are not discussed specifically.

The coupling chuck 16 is secured to the shaft 74 journaled on the bearing 75 in the gear box mechanism 24 and has secured thereto the drive gear 76. As shown in FIGS. 4 and 5 the shaft 74 is journaled above the shaft 77 and the gear 76 is connected to the pinion 78 the opposite side of the pinion 78 engages the gear 79 which is secured to the outer member of the standard overrunning clutch 80. This overrunning clutch rotates the shafts as indicated by the forward direction arrows. In tightening couplings having right hand threads the shaft 74 must rotate as indicated by the forward arrow marked on the shaft. The overrunning clutch 80 is depicted by the bearing members 81 secured between the outer member 80 and the hub member 82, the latter being keyed to the shaft 83. Each of the shafts 77, 83 and 84 are supported by antifrictional bearings indicated at 75 and similar to that supporting the shaft 74. As shown in FIG. 4 the jack shaft 84 is supported in the box 24 for the purpose of carrying the gear 85 rotated by the pinion 86 on the shaft 83. The gear 85 in turn rotates the jack shaft 84 which is provided with a pinion 87 that rotates the gear 88 and the shaft 77. The gear 88 has attached the overrunning clutch member 90 having its bearing members 91 secured between the outer portion 90 and the hub portion 92 that is in turn keyed to the shaft 77.

The shaft 83 is driven by the alternating reversible current motor 22, as previously stated, through the coupling 23. If this motor, as shown in FIG. 4 is rotating in a counterclockwise direction as indicated by the arrow marked "forward," when this motor is reversed it will rotate in the clockwise direction as indicated by the arrow marked "reverse." The overrunning clutch 80 is constructed to drive the gear starting with the train gear 79 to rotate the shaft 74 and the coupling chuck 16 in a counterclockwise direction as shown in FIG. 5 to screw the coupling onto the pipe. If the motor 22 is reversed then the overrunning clutch 80 has no effect but the overrunning clutch 90 does have effect. This drive mechanism which is materially reduced in speed due to the size of the pinion 86, the pinion 87 and the gear 85 is operated through the jack shaft 84 to drive the shafts 74 and 77 in the same direction as they are driven when the overrunning clutch 80 is in effect but at a slower speed. It is at this slow speed that a greater torque is applied for screwing the coupling on to the pipe for a predetermined torque tightness.

Figure 6:
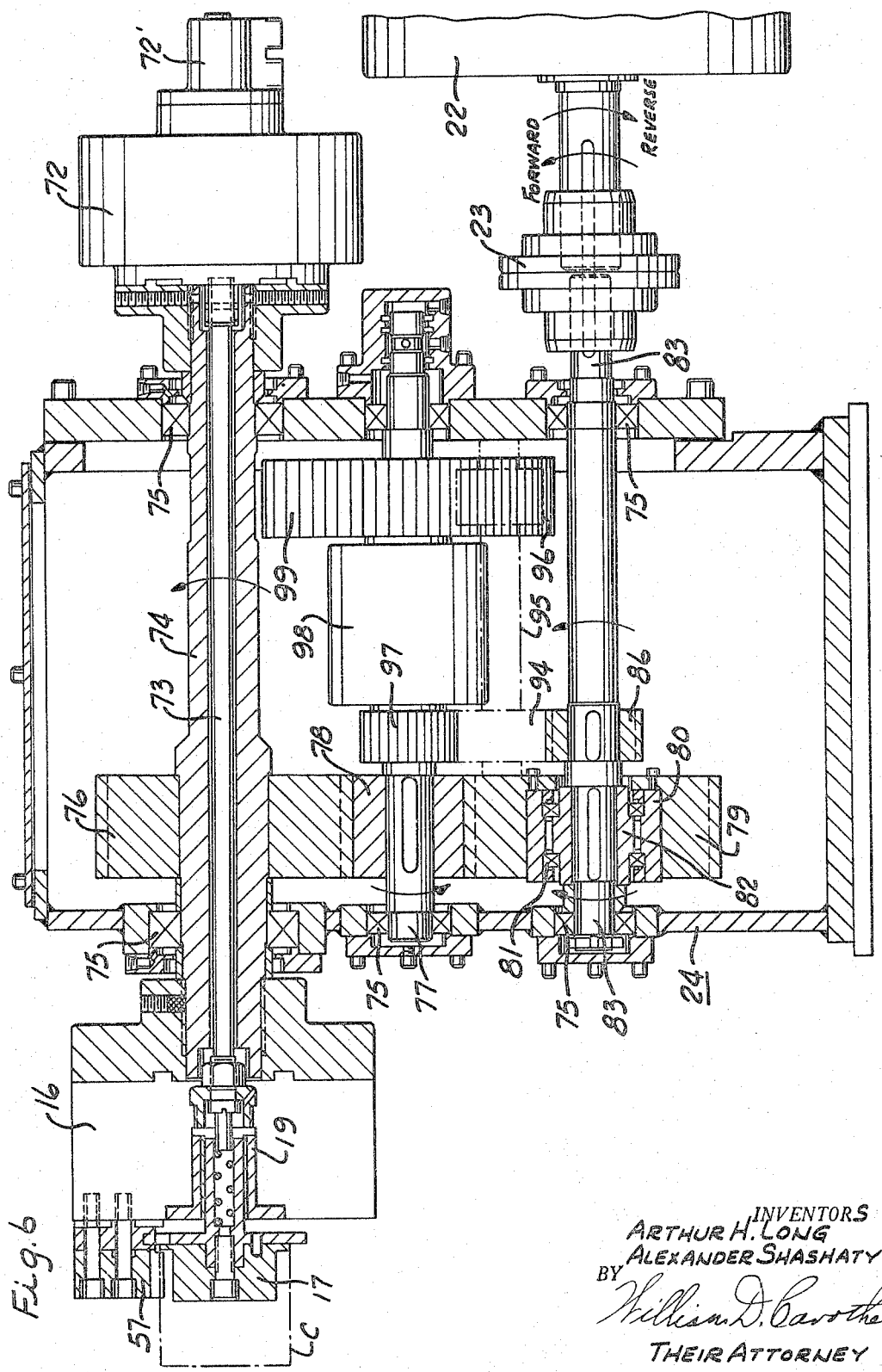
FIG. 6 is a view in longitudinal vertical section of modified form of the drive mechanism.

The structure shown in FIG. 6 is similar to that of FIG. 5 but employs a different mode of drive. The jaws 57 of the continuously rotating coupling chuck 16 are actuated by the fluid motor 72 in the same manner as that previously described. The rotary union 72' supplies fluid to actuate the piston in either direction in operating the fluid motor 72. The coupling C is forced against the actuating member 17. The jaws 57 then close inwardly. The chuck jaws 57 clamp the coupling causing it to rotate with the continuously rotating shaft 74. The S-ring in the member 17 helps keep the coupling C against the pipe P.

Figure 7:
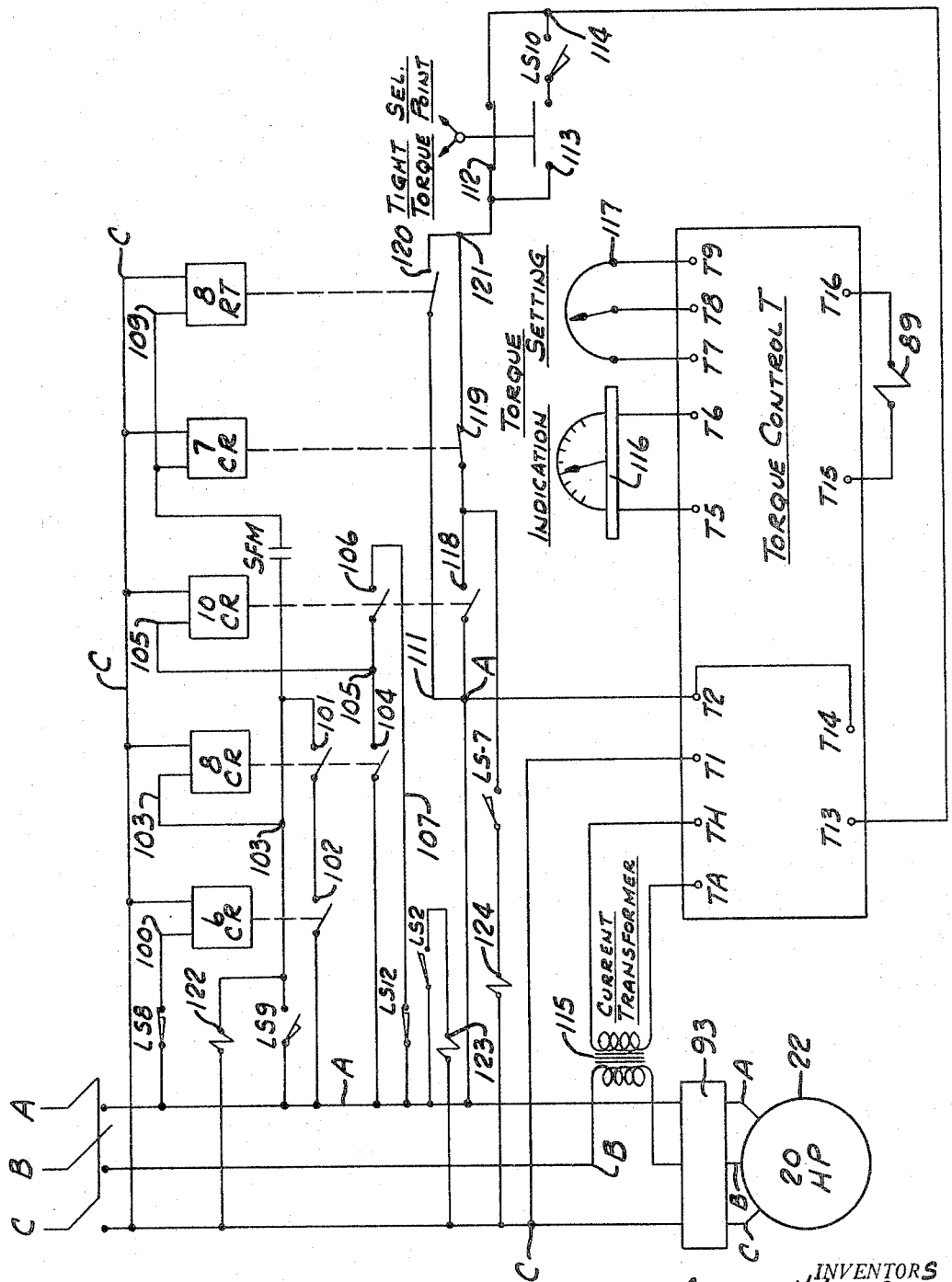
FIG. 7 is a diagrammatic view of the operating circuit of the coupling screw on machine.

The motor 22 is controlled by a switching mechanism 93 shown in FIG. 7 to allow it to run in a forward or counterclockwise direction at 1200 r.p.m. when viewed from the left in FIG. 6. The shaft 83 thus turning counterclockwise will drive the gear 79 through the overrunning clutch 80 in a counterclockwise direction. This gear which is constantly in mesh with the gear 78 on the shaft 77 which in turn is constantly in mesh with the gear 76 on the shaft 74. Thus rotating the shaft 74 in a counterclockwise direction will screw the coupling with its right hand thread on to the pipe. The overrunning clutch 80 will drive only when the shaft 83 is rotated in a counterclockwise direction. Thus the gear 76 and the gear 79 having the same number of teeth determines the speed of the shaft 74 as 1200 r.p.m., the same as that of the motor.

When the motor 22 is reversed and the shaft 83 is rotated in a clockwise direction, as viewed from the left in FIG. 6, the overrunning clutch 80 will not drive. However, the gear 86 is in mesh with the gear 94 mounted on the jack shaft 95 which is also provided with the pinion 96. The jack shaft 95 and the gears 94 and 96 thereon are indicated by dotted lines because the section line of the structure illustrated is beyond the axial center of these gears. The gear 94 in turn is in mesh with the gear 97 which may be selectively connected through the hydraulically operated dual power clutch 98 to the shaft 77 to rotate the same in a clockwise direction. Thus the dual power clutch 98 may remain in neutral, the gears 97 and 99 being in idling operation, while driving the gear 79 counterclockwise or it may connect either the gear 97 or the gear 99 with the shaft 77 when the motor 22 is rotating clockwise. The gear train 86, 94 and 97 will provide a drive of 600 r.p.m. in the shaft 74 through the gears 78 and 76. Thus when the motor 22 is merely reversed, the power is transferred through the gear 86, the jack shaft 95 and the power clutch 98 causing reduction of the speed of the shaft 74 to 600 r.p.m. with an accompanying greater torque. Thus the shafts 77 and 74 are still operating in the same direction but at a lower r.p.m.

To effect a further reduction in speed of the shaft 74 the dual power clutch 98 is actuated to permit the drive to be effective through the jack shaft 95, the gear 96, and the corresponding gear 99 to drive the shaft 77 through the power clutch 98 and operate the shaft 74 at 60 r.p.m. Here the clutch permits the gear 99 to drive the shaft 77 and the gear 97 is in ineffective operation, that is; merely idling. The drive from the gear 78 to the gear 76 and the shaft 74 is operated at only 60 r.p.m., yet the motor 22 is turning at 1200 r.p.m. This provides a much higher torque for power tightening the coupling onto the pipe.

In tightening couplings on pipe of all sizes up to and including one inch pipe, the motor 22 is operated in a forward direction which is counterclockwise and at this speed the couplings are made power tight. For pipe over one inch in size the drive is effected through the shaft 74 at 600 r.p.m. for hand tight in which the drive through the gears 86, 94 and 97 and when it is desired to make the coupling power tight the drive is directed through jack shaft 95 by gears 96 and 99 to the shaft 77 and then the shaft 74 to obtain 60 r.p.m. to power tighten the coupling. Thus in place of employing two overrunning clutches this device may be operated to provide a power clutch 98 which is connected to the shaft 77 and selectively connects the drive to either gear 97 or gear 99 or when placed in neutral will disconnect the drive altogether leaving gears 97 and 99 in idle operation on the shaft 77.

The following is a description of the use of the coupling screw-on machine and how it operates automatically. To begin with, when the indexing circuit is actuated, the walking beam feeders 4 swing forward into position carrying a pipe which has already been positioned by positioning rollers 5. This pipe is placed by the feeders 4 in the jaws 7 and 8 of the pipe chuck 10 since the rollers 5 have moved the pipe to the left. In FIG. 1 the pipe will now lie within the center line 56 as shown in FIGS. 2 and 3. As shown in FIG. 2 the limit switch LS2 will be actuated at this time due to the placing of the pipe in the chuck 10. This limit switch LS2 permits the cylinder 53 to operate and close the pipe chuck jaws 7 and 8. The close of the pipe chuck jaws actuates another limit switch LS8 which is shown also in FIG. 2. This limit switch, when the pipe chuck jaws are open, permits the table indexing motors to operate. However, when these pipe chuck jaws are closed, the limit switch LS8 does not permit the table indexing motors to operate, and also in its closed position will actuate the fluid cylinder 12 as shown in FIG. 2 which causes the carriage 39 to move forward or to the left in FIG. 2.

As the walking beam feeders 4 move a pipe into position in the pipe chuck 10, a cam on the feeder 4 actuates a limit switch (not shown in the drawings) which causes the feeder block 15 to move from the left to the right in FIG. 3 which is the reload position and is the exact position shown in FIG. 3. As can be seen in this figure a limit switch LS12 is actuated due to the feed block 15 being in the loading position. In this position the feed block 15 receives a coupling from the coupling feeder chute 18 which is shown clearly in FIG. 1. The limit switch actuated by the feeders 4 causes the feeder block 15 to go from left to right in FIG. 3 in the loading position. The limit switch LS12 stops the fluid motor 20 from moving the feeder block 15 and causes the piston of this fluid motor to reverse its direction and thus bring the feeder block with the coupling back to a position where the center of the coupling will be on the center line 56.

The feeder block 15 is also raised so that the center line of the coupling is on the center line 56. The limit switch LS12 also actuates and permits the fluid motor 65 to operate by extending its piston rod 64 and this in turn causes the wedge 63 to move into position or move to the right in FIG. 3.

Therefore, limit switch LS12 actuates two fluid motors, both cooperating through adjustment to place the center of a coupling in exact alignment with the center line of a pipe locked in the pipe chuck jaws 7 and 8. This enables the pipe to stab a coupling in the center block 15 and carry the coupling to the left in FIG. 2 where it engages the member 17.

After the limit switch LS8 is closed and allows the carriage 39 to move forward, the carriage will eventually actuate a limit switch LS9 shown in FIG. 2. This limit switch closes the jaws 57 of the rotating coupling chuck 16 and with the coupling rotating with the this chuck 16 and held firmly in the jaws 57 to prevent any movement on the member 17, the coupling will begin to thread on the pipe held firmly by the pipe chuck 10. When the coupling is threaded on the pipe a predetermined distance (or in some cases at a predetermined torque tightness) the limit switch LS10 shown in FIG. 2 is actuated. This switch upon closing, does two operations: (1) it opens the coupling chuck 16, and (2) reverses the direction of the carriage 39, that is; the carriage begins to move to the right in FIG. 3, the piston rod being extended from the fluid cylinder 12. As the carriage 39 moves in this reverse direction it eventually will actuate the limit switch LS7 shown in FIG. 2. This limit switch will stop the fluid cylinder 12 from operating and the carriage 39 will come to a stop. LS7 also permits the cylinder 53 to retract its piston 49 downwardly and thereby permits the limit switch LS8 to open, which in turn permits the motors of the indexing table to operate. The pipe with the coupling threaded on is removed from between the now open pipe chuck jaws 7 and 8 by the walking beam feeders 4 and placed on the rollers 26. The feeders 4 then return toward the skidders 2 where another pipe is received and placed in the pipe chuck 10, the pipe in place actuates the limit switch LS2. Thus the complete operating cycle of the machine is completed.

Referring to FIG. 7 it will be noted that only a portion of the circuit is shown and just enough to illustrate the important features of this invention. Here the alternating current line is a three-phase system indicated by the lines A, B and C for operating the 120 horsepower motor 22 which is provided with a form of reversing mechanism as indicated at 93. In this circuit diagram there are six limit switches which have been discussed above. The limit switch LS8 is connected to phase A of the three phase system and its other end, line 100, is connected to a relay 6–CR. The relay 6–CR has a front contact 102, and the other side of the relay 6–CR is connected to phase C of the three phase system. The limit switch LS9 is also connected to phase A and its other end is connected to line 103 which in turn is connected to the relay 8–CR which has a front and back contact 104 and 101 repectively and also is connected to one side of the spindle coupling forward motor starter indicated as SFM in FIG. 7. The front contact 102 of the relay 6–CR and the front contact 101 of the relay 8–CR are connected in series between phase A and line 103. Limit switch LS12 is also connected to phase A and its other side is connected to the line 107 which in turn is connected to the front contact 106 of relay 10–CR. The other side of the front contact 106 is connected to line 105 which in turn is connected to the front contact 104 of relay 8–CR and also to one side of the relay 10–CR. The other side of the relay 10–CR is connected to phase C. The limit switch LS2 is connected through solenoid 123 across phase A and C. The other side of the spindle coupling forward motor starter switch SFM is connected to one side of the relay 7–CR and to one side of the time relay 8–TR through line 109. The other side of the relay 7–CR and the time relay 8–TR are connected to phase C. Relay 7–CR has a back contact 119 and time relay 8–TR has a front contact 120. The limit switch LS7 is fiirst connected to phase C which in turn is connected to one side of each of the front contacts 119 of relay 7–CR and the front contact 118 of relay 10–CR. The other side of the front contact 118 of the relay 10–CR is connected to phase A through line 111 and also line 111 is connected to one side of contact 120 of the time relay 8–TR. Line 111 is also connected to terminal T2 of the torque control T. The terminal T1 as well as T14 is connected to phase C. This is a supply for the torque control T of 110 volts. Phase B is connected to a current transformer 115 whose secondary is in turn connected to the terminals TA and TH of the torque control T for the purpose of supplying smaller current to operate this special torque control mechanism T.

The back contacts 119 of the relay 7–CR and the front contact 120 and the time relay 8–TR respectively are connected together and in turn are connected to the contacts 112 and 113. The purpose of the contacts 112 and 113 is that if the tight selector switch is positioned to connect a contact 113 to the limit swich LS10 which in turn is connected to line 114, then one is determining the tightness of a coupling on a pipe by the amount of the distance the coupling is screwed on that pipe. In other words, the distance between the limit switch LS9 and LS10 is the distance that the coupling will be screwed on the pipe. If the tight selection switch connects contact 112 to line 114 which is connected to terminal T13 then the tightness of the coupling on the pipe is determined by the amount of torque being supplied by the rotary chuck 16. So a predetermined rise in current to the motor 22 indicating a sufficient torque tightness is effected permits the solenoid 89, controlling the fluid motor 72, to be energized for the purpose of opening the chuck jaws 57 on the coupling in the coupling chuck 16. In FIG. 7 the solenoid 89 is shown connected across the terminals T15 and T16. The torque control member T also has a torque indicator as shown at 116 and a torque setting device 117. Thus one is enabled through this mechanism to select the torque tightness desired for actuating the solenoid 89 to open the jaws of the continuous rotating coupling chuck 16 and thereby release the coupling before the chuck jaws mar the same. The torque control mechanism T is a phase operating device and is quite sensitive. As noted above when the torque control mechanism T is in service the contact 112 indicates a torque tight condition when closed thereby leaving the limit switch LS10 out of operative position in the circuit. When the contact 113 is closed, the limit switch LS10 is in operative position. For these tightness mechanisms to work energy must be supplied through line 121. However, the normally open front contact 120 of the time relay 8–TR must be closed.

In FIG. 7 when the limit switch LS2 is closed the pipe chuck jaws 7 and 8 of the pipe chuck 10 will close as explained above. The closing of the jaws 7 and 8 in turn closes the limit switch LS8 which permits the relay 6–CR to energize and close its front contact 102. As the carriage 39 moves forward and finally closes the limit switch LS9 the front contacts 104 and 101, respectively, of the relay 8–CR are closed. Note also that since the front contact 104 of the relay 8–CR is closed current will be supplied to the relay 10–CR, thereby energizing it and closing its front contacts 118 and 106 respectively.

The spindle coupling forward motor starter switch is shown in FIG. 7 to show that if the carriage is moving forward and actuates the limit switch LS9 and if this switch is open and has not been closed the relay 7–CR and the time relay 8–TR will never be energized. The switch SFM controls the power to the motor 22. If that switch is not closed the motor 22 will not operate. Since the relay 7–CR and 8–TR will not operate, the whole threading operation and the torque control sensing device T will not be actuated. Therefore, the carriage 39 will just move forward and reverse when the limit switch LS10 is closed assuming the contact 113 is in closed position. Note that the limit switch LS10 will be able to function because it will be energized through line 111 and front contact 118 of the relay 10–CR and through the normally closed back contact 119 of the relay 7–CR which is still closed because it has not been energized due to the open switch SFM. So the carriage 39 merely moves forward and back and the torque control mechanism T will not function until the switch SFM is closed. When the switch SFM is closed and the motor 22 is operated and the coupling chuck 16 is operating the normally closed contact 119 of the relay 7–CR will open. The front contact 120 of the relay 8–TR will not close immediately but will close after a predetermined time. Thus it permits the coupling jaws 57 of the coupling chuck 16 to close though energizing the solenoid 122 and enables the threading operation to start before the torque control sensing device will be actuated. When the front contact 120 comes to its closed position, phase A is connected through line 111 the front contact 120 and directly to the contact 112 or 113 depending on which of the latter is in use. Energy is supplied to the torque selection point permitting the torque control mechanism T to operate and function.

When the carriage 39 is returning to its normal position or loading position the limit switch LS9 will open. However, the pipe chuck jaws 7 and 8 will not open at that time because current is fed through front contacts 102 of 6–CR and front contact 101 of 8–CR in order to maintain the relay 8–CR in its energized position. When the limit switch LS7 is closed the carriage comes to a stop and the pipe chuck 10 will open. When the coupling chuck opens the limit switch LS8 will open also. Therefore, the relay 6–CR will be de-energized which in turn de-energizes the relay 8–CR which relay in turn will open its front contact 104 and de-energize the relay 10–CR. This places all other controlling relays out of the circuit until the operation is again begun and the limit switch LS8 is closed. The solenoid 122 actuates the opening or closing of the coupling chuck 16. The solenoid 123 actuates the opening of the pipe chuck 10 and the solenoid 124 actuates the closing of the pipe chuck 10. With this circuit one is enabled to accurately determine the degree of power tightness. Any degree of torque tightness may be had for a large pipe. This is very effective in determining different degrees of torque tightness of couplings through setting a torque control mechanism T by the torque setting device.

Thus with this mechanism one may make a coupling hand tight. When employing this invention on a pipe larger than one inch in diameter with a 600 r.p.m. drive, a power tight condition at selected torques may be measured in foot pounds when rotating the coupling chuck 16 at 600 r.p.m. through the power clutch mechanism 98.

We claim:

1. A machine for applying and tightening thread coupling members on threaded pipe members to a predetermined degree of tightness while at one station which consists of a non-rotary pipe chuck means and a continuously rotating coupling chuck means mounted in axial alignment and for relative rotary and axial movement to hold complementary threaded pipe and coupling members to be screwed together, means to chuck said pipe member in said pipe chuck means, power means to move said pipe chuck means and the pipe axially to stab and pick up and move said coupling member into clamping engagement with said rotating coupling chuck means, drive means to rotate said coupling chuck means relative to said pipe chuck means at a selected speed to threadably run the threaded members to hand tight or to selectively screw said threaded members at slower speed until said threaded members reach a predetermined torque tightness.

2. A machine for screwing couplings on a pipe from hand to power tight consisting of a non-rotary pipe chuck means and a continuously rotating coupling chuck means mounted in axial alignment to hold complementary threaded pipe and coupling members to be secured together, an alternately selective rotary high speed clutch means and a rotary low speed clutch means both of which are connected to continuously drive said coupling chuck means, power means to move said pipe chuck means axially while retaining the pipe member from rotation to stab the pipe thread into the threaded coupling and carry it into clamping engagement with said coupling chuck means rotating at high speed through said high speed clutch means, means responsive to further predetermined axial movement of said pipe chuck means to de-energize said high speed clutch means to provide a coupling member threaded hand tight on the pipe member, means to selectively energize said low speed clutch means to screw the coupling member further on the pipe member, and means to stop the drive through said low speed clutch means when said coupling has reached a predetermined torque tightness.

3. The coupling screw-on machine of claim 2 characterized by a reversible motor connected to drive said high speed and low speed clutch means to rotate said coupling chuck means in the same direction.

4. The coupling screw-on machine of claim 2 characterized in that said high speed and low speed clutch means are overrunning clutches.

5. The coupling screw-on machine of claim 1 characterized in that said pipe chuck means is an upwardly open chuck, index means to place consecutive pipe members into and out of said upwardly open pipe chuck means at the beginning and end of said coupling screw on operation, a stop, a line of rotary driven positioner rolls, and a selector for taking consecutive pipe members and delivering them to said positioning rolls which position each consecutive pipe member against said stop in readiness for said index.

6. A machine for applying and tightening thread coupling members on threaded pipe members to a predetermined degree of tightness while at one station which consists of two chuck means mounted in axial alignment and for relative rotary and axial movement to hold complementary threaded pipe and coupling members to be screwed together, means to chuck said pipe member in said pipe chuck means, power means to move at least one chuck means axially to pick up and stab one member with the other member and into threaded engagement and to position said coupling member into clamping engagement with said coupling chuck means, drive means to rotate at least one of said chuck means relative to the other chuck means at a variable speed to threadably run the threaded members to hand tight and to selectively screw said threaded members further together at slower speed until said threaded members reach a predetermined torque tightness, and a coupling supply feeder terminating in a vertical chute, a transverse coupling feeder including a slide, a servo motor for reciprocating said slide, a feeder V block on said slide to receive a coupling from under said chute and carry it to the vicinity of the center line of said coupling chuck, and means to lower said feeder V block after the coupling member has been stabbed by said pipe member.

7. The coupling screw-on machine of claim 6 characterized in that said means to lower said feeder V block is a fluid actuated wedge slidable between complementary surfaces to lower and raise the same.

8. The coupling screw-on machine of claim 1 characterized by control means to consecutively actuate said pipe chuck means, said power means, said coupling chuck means to grip and to open the coupling chuck means to ungrip the coupling, and retract and remove the coupled pipe and coupling member by said power means and open said pipe chuck means.

9. A coupling screw-on machine comprising a pipe carriage having a pipe vise to move the pipe into a coupling and stab the same and carry it forward into a rotating coupling chuck which holds and screws the coupling onto the pipe, a continuously operating motor to continuously rotate said coupling chuck and circuit means including a torque control means actuated by the power load of said continuously operating motor to open said coupling chuck at a predetermined torque setting.

10. The coupling screw-on machine of claim 9 characterized by means to predetermine the torque setting by the measurement of the power load of said continuously operating motor.

11. The coupling screw-on machine of claim 10 characterized by an electromagnetic control means to operate said coupling chuck and energized by said torque control means including said means to predetermine the torque setting and to open said coupling chuck.

12. The coupling screw-on machine of claim 9 characterized in that said circuit means includes relay means having contacts in said circuit means to check the operating position of said pipe vise and pipe carriage before completing said circuit means.

13. The coupling screw-on machine of claim 12 characterized in that said circuit means also includes limit switch means the position of which determine the operating position of said pipe vise and pipe carriage.

14. A machine for screwing a coupling on a pipe consisting of a non-rotary pipe chuck means and a continuously rotating coupling chuck means mounted in axial alignment to hold a complementary threaded pipe and a coupling to be secured together, a rotary clutch means including a selective rotary high speed clutch means and a rotary low speed clutch means for driving said continuously rotating coupling chuck means, a constant speed reversible motor connected to selectively operate said high speed clutch means when said motor is operating in one direction and said low speed clutch means when said motor is operating in the opposite direction, control means to selectively reverse said motor, power means to move said pipe chuck means and pipe axially while retaining the pipe from rotation to stab the pipe thread into the threaded coupling and carry it into clamping engagement with said continuously rotating coupling chuck means, and means responsive to further predetermined axial movement of said pipe chuck means to open said rotating coupling chuck means to release said coupling threaded on said pipe.

15. A coupling screw-on machine of claim 14 characterized in that both of said high and low speed clutch means are overrunning clutches.

16. The coupling screw-on machine of claim 14 characterized in that said high speed clutch means is an overrunning clutch and said low speed clutch means is a dual power clutch to selectively operate said continuously rotating coupling chuck at two selective slow speeds when said motor means is reversed.

References Cited by the Examiner
UNITED STATES PATENTS

| | | | |
|---|---|---|---|
| 1,765,825 | 6/1930 | Cork | 29—240 |
| 2,756,490 | 7/1956 | Sawdey | 29—240 |
| 2,984,000 | 5/1961 | McConnell | 29—240 |
| 3,035,336 | 5/1962 | McConnell | 29—240 |
| 3,039,181 | 6/1962 | Sawdey | 29—237 |

WILLIAM FELDMAN, *Primary Examiner.*

J. C. PETERS, *Assistant Examiner.*